US012172457B2

(12) United States Patent
Whitty

(10) Patent No.: US 12,172,457 B2
(45) Date of Patent: Dec. 24, 2024

(54) PAGE HOLDER DEVICE

(71) Applicant: Angus Whitty, Slough (GB)

(72) Inventor: Angus Whitty, Slough (GB)

(*) Notice: Subject to any disclaimer, the term of this patent is extended or adjusted under 35 U.S.C. 154(b) by 0 days.

(21) Appl. No.: 17/892,182

(22) Filed: Aug. 22, 2022

(65) Prior Publication Data

US 2024/0066908 A1 Feb. 29, 2024

(30) Foreign Application Priority Data

Aug. 24, 2021 (GB) ...................................... 2112129

(51) Int. Cl.
*B42D 9/00* (2006.01)

(52) U.S. Cl.
CPC .................................... *B42D 9/007* (2013.01)

(58) Field of Classification Search
CPC ...................................................... B42D 9/007
USPC ............................ 281/45, 46, 47, 48, 49, 50
See application file for complete search history.

(56) References Cited

U.S. PATENT DOCUMENTS 5,437,240 A * 8/1995 Miroyan ................ B42D 9/007 116/235
5,722,691 A * 3/1998 Patel ........................ B42D 9/00 281/45

* cited by examiner

*Primary Examiner* — Justin V Lewis
(74) *Attorney, Agent, or Firm* — Jose Cherson Weissbrot

(57) ABSTRACT

The present disclosure relates to a page holder device for holding the pages of a book open. The page holder device comprises an elongate arm that is configured to extend across pages of an open book and to apply pressure to the pages in order to hold the book in an open configuration, and an engagement element that is coupled to the arm and configured to be engaged by a user of the device in order to press the page holder device towards the book. The engagement element is movable along the arm between an inner position located in a central region of the arm and an outer position located towards an end of the arm in order to facilitate use of the device as both a page holder and a bookmark.

9 Claims, 3 Drawing Sheets

PAGE HOLDER DEVICE

FIELD OF THE INVENTION

The present invention relates to a device for holding the pages of a book open.

BACKGROUND OF THE INVENTION

Readers of books often have difficulty holding a book open with the pages of the book at a convenient angle, particularly when reading while lying down and/or when attempting to hold the book with one hand.

Early devices for aiding readers in holding a book open typically included a stand or holder for receiving the book and one or more arms or clips for holding the book open. However, such devices are unwieldy and inconvenient to use, and can obstruct the text on a page.

More recently, smaller and more convenient page holder devices have become available that can be used with one hand and do not need to be clipped onto or surround the book. These devices typically include a finger or thumb engaging portion that is configured to be engaged by a user and a pair of arms that extend a small distance outwardly from the finger or thumb engaging portion and are configured to apply downward pressure to the pages of the book in order to hold the book open. Examples of such devices are disclosed, for example, in GB2325884A and U.S. Pat. No. 453,789.

Devices of the type disclosed in GB2325884 and U.S. Pat. No. 453,789 have greatly increased the ease with which users of the devices are able to hold a book open. However, these devices suffer from various disadvantages. For example, these devices typically only extend across a relatively small proportion of the distance from the spine to the edges of the pages of a book in use, thereby allowing the edges of the pages to lift, especially when the device is used to assist reading of a book outside in a windy environment. In addition, these devices are not well suited to being used as bookmarks as they typically need to be arranged with the arms extending between the pages of the book along the upper edge of the book in a direction from the spine of the book towards the unbound side edge of the book, and are not capable of extending far into the book along the book's spine. This results in the devices being easily dislodged when used as bookmarks. In fact, if devices of this type are to be used as bookmarks they are typically limited to a maximum total width of less than one page width of a typical book in order to be usable as a bookmark without protruding outwardly beyond the unbound side edge of the book. Moreover, these devices still obscure some of the text on the pages of the book in use, and can also damage the pages.

The present invention aims to address disadvantages of known page holder devices.

SUMMARY OF THE INVENTION

According to a first aspect of the invention, there is provided a page holder device, the page holder device comprising an elongate arm that is configured to extend across pages of an open book in use, and an engagement element that is coupled to the arm and configured to be engaged by a user of the device in order to press the page holder device towards the book. The engagement element comprises a user engaging portion located on a first side of the arm and a book engaging portion located on a second side of the arm opposed to the first side. The user engaging portion includes a pad or aperture that is configured to be engaged by one or more digits of a user in order to apply a force to the arm of the page holder device, and the book engaging portion comprises a protrusion that is configured to be received within a spine or gutter area of a book (that is in the groove between the pages when the book is in an open configuration). The engagement element is movable along the arm between an inner position located in a central region of the arm and an outer position located towards an end of the arm.

By arranging the engagement element to be movable between an inner position and an outer position on the arm, the present invention allows the page holder device to be used in two different configurations. When the engagement element is in the inner position, the arm can be placed across the pages of a book and the engagement element can be used to apply pressure to the centre of the arm in order to press the page holder device towards the book. However, when the engagement element is in the outer position, the page holder device can be used as a bookmark, with the engagement element being located outside the book but the arm being received between pages of the book up to the engagement element. In this case the majority of the length of the arm may be received between pages of the book, and the arm may be arranged to extend along a significant portion of the height of the book at a position close to the book's spine. In this way the page holder device of the present invention may be retained more securely than other known page holder devices when used as a bookmark.

It will be appreciated that the engagement element may be movable into two different outer positions located towards the opposed ends of the arm. In this case the engagement element may be movable along the arm between the two outer positions via the inner position.

It will also be appreciated that the inner and outer positions may be precisely defined positions on the arm in which the engagement element is selectively fixable, or alternatively regions of the arm into which the engagement element is movable.

In some embodiments the engagement element may be located at the very end of the arm when in the outer position such that the arm only extends outwardly from the engagement element on one side thereof. However, in other cases the engagement element may still be located inboard of the end of the arm when in the outer position such that the end of the arm still extends outwardly beyond the engagement element, albeit to a significantly lesser extent than when the engagement element is in the inner position.

The engagement element may be configured for sliding movement along the arm.

The engagement element may comprise an aperture within which the arm is received, and the arm may be movable within the aperture in a direction aligned with its longitudinal axis. It will, however, be appreciated that other movable mounting arrangements are also possible.

The page holder device may comprise a locking mechanism for selectively fixing the position of the engagement element with respect to the arm. The locking mechanism may be operable to temporarily fix the engagement element at the inner and outer positions on the arm. In some cases the locking mechanism may also be operable to temporarily fix the engagement element at other intermediate positions between the inner and outer positions.

The locking mechanism may comprise a locking formation provided on the engagement element that is engageable with a plurality of locking formations provided on the arm. The plurality of locking formations provided on the arm may, for example, include at least one inner locking formation provided in the central region of the arm and at least one outer locking formation provided towards at least one end of the arm.

The locking formation provided on the engagement element may comprise a protrusion, and the locking formations provided on the arm may comprise recesses or apertures that are configured to receive the protrusion therein.

It will be appreciated that many other types of locking mechanism are also possible, including a friction or interference fit between the engagement element and the arm.

The locking mechanism may be configured to be disengaged by lifting at least a portion of the engagement element with respect to the arm.

The engagement element may be formed of a flexible or elastomeric material, and may be configured to be deformed in order to facilitate disengagement of the locking mechanism.

The user engaging portion of the engagement element may be movable relative to the book engaging portion of the engagement element in order to facilitate disengagement of the locking mechanism. The user engaging portion may, for example, be connected to the book engaging portion via a connecting portion on one side of the arm only, and the connecting portion may be configured to be deflected in order to permit the user engaging portion to be pivoted away from the book engaging portion.

The arm may have a length of at least 120 mm, more preferably at least 150 mm. In a preferred example, the arm has a length of approximately 180 mm. Forming the arm with a length of at least 120 mm or 150 mm advantageously allows the arm to extend across a sufficiently large portion of the pages of a typical book to prevent the edges of the pages from lifting even in windy environments.

It is noted that existing page holder devices with fixed user engaging portions generally have an arm span of less than 120 mm, and would not be capable of being used as book markers if they had an arm span of 120 mm or more as they would then protrude too far outwardly from the side of a typical book. However, the fact that the engagement element of the present invention is capable of being moved into an outer position towards an end of the arm enables the entire remaining portion of the arm inboard of the engagement element to be received between the pages of a typical book without protruding outwardly from the book, thereby facilitating the use of a longer arm, for example an arm with a length of 120 mm, 150 mm or more.

The arm may have a width of at least 8 mm, more preferably at least 10 mm. In a preferred example, the arm has a width of approximately 12 mm. It will be appreciated that the width of the arm refers to the dimension of the arm in a direction transverse to the longitudinal direction of the arm in a plane parallel to the surface of the arm that is configured to engage pages of a book in use, as opposed to the thickness of the arm which extends in a direction transverse to the page engaging surface of the arm.

Forming the arm with a width of at least 8 mm or 10 mm enables the page holder device to engage pages of a book with which the device is used more securely, and also reduces the likelihood of the arm causing damage to the pages of the book. The arm may be provided with rounded corners and/or edges in order to further reduce the likelihood of the arm causing damage to the pages of the book.

The arm may have a thickness that is significantly lower than its width, preferably a thickness of 3 mm or less. In a preferred example, the arm has a thickness of approximately 2 mm. Forming the arm with a comparatively low thickness advantageously allows the arm to be received neatly between the pages of a closed book when used as a bookmark, and in particular allows the arm to be located closer to the spine for improved retention.

The arm may be formed of a material that is at least substantially transparent. By forming the arm of a transparent material it is possible to enable a reader to read text on pages of a book with which the page holder device is used that would otherwise be obscured by the arm.

BRIEF DESCRIPTION OF DRAWINGS

Embodiments of the invention will now be described by way of non-limiting example only and with reference to the accompanying drawings, in which.

DETAILED DESCRIPTION OF EMBODIMENTS

Figure 5A:
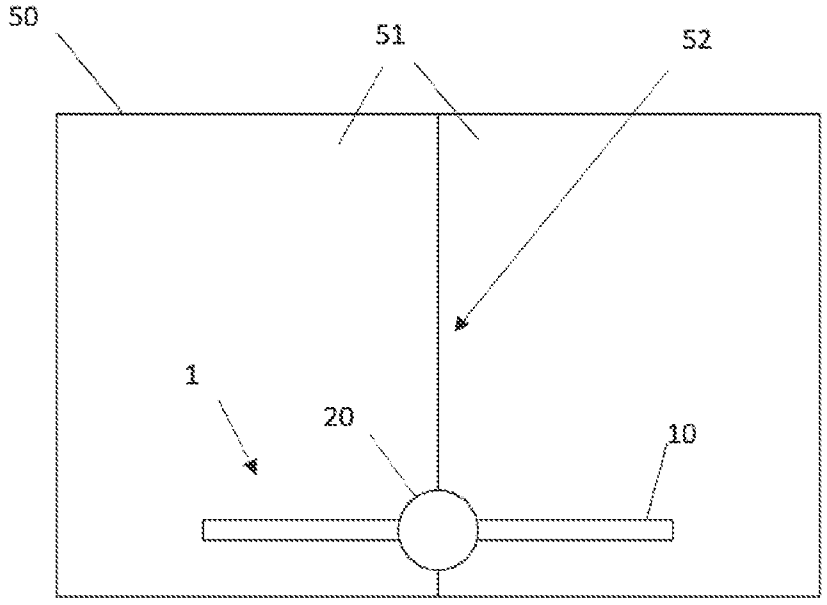
FIGS. 5A and 5B schematically illustrates the page holder device in use.

FIGS. 1A, 1B, 2A and 2B schematically illustrate a page holder device 1 in accordance with one possible embodiment of the present invention. As shown in these figures, the page holder device 1 comprises an elongate arm 10 and an engagement element or hub 20 that is coupled to the arm 10. The arm 10 is configured to extend across pages 51 of an open book 50 and to apply pressure to the pages 51 in order to hold the book 50 in an open configuration, as schematically illustrated in FIG. 5A, and the hub 20 is configured to be engaged by a digit of a user of the device 1 in order to press the page holder device 1 towards the book 50.

The arm 10 has a rectangular cross section with a width of approximately 12 mm and a height of approximately 2 mm, and extends over a length of approximately 180 mm in its longitudinal direction between a first end 11 and a second end 12. The arm 10 is formed of an at least substantially transparent plastics material to prevent it from obscuring text on the pages 51 of the book 50, and may have rounded corners and/or edges in order to reduce the likelihood of the arm 10 marking the pages 51 of the book 50.

The arm 10 is provided with three rectangular through holes or apertures 15_a_, 15_b_, 15_c_ each extending through the thickness of the arm 10 from an upper surface 13 of the arm 10 to a lower page-engaging surface 14 of the arm 10. A first one 15_a_ of the apertures is provided at an approximately central location along the length of the arm 10. The remaining apertures 15_b_, 15_c_ are each provided towards a respective end 11, 12 of the arm 10.

Figure 3:
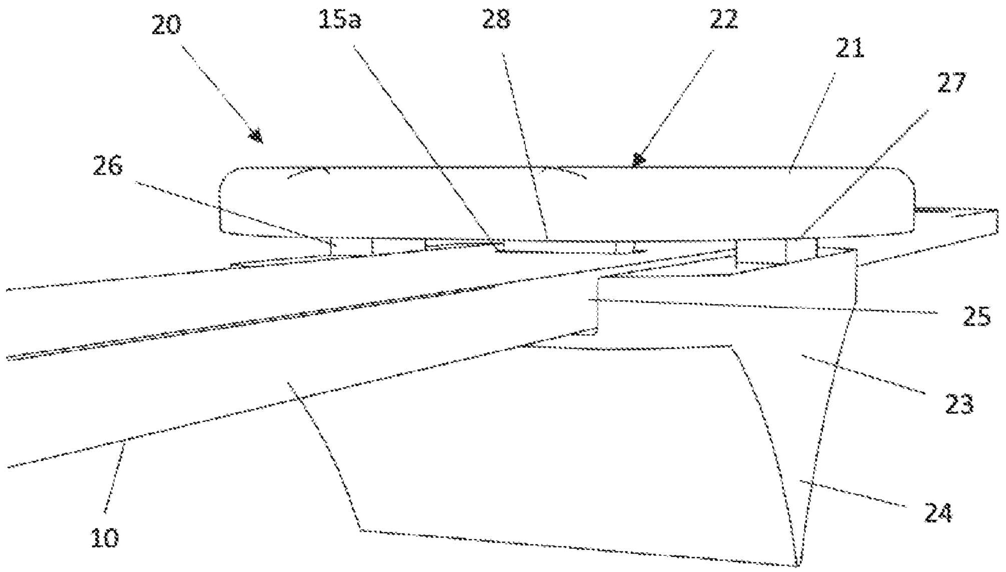
FIGS. 3 and 4 schematically illustrate an engagement element or hub of the page holder device of FIGS. 1A, 1B, 2A and 2B.
Figure 4:
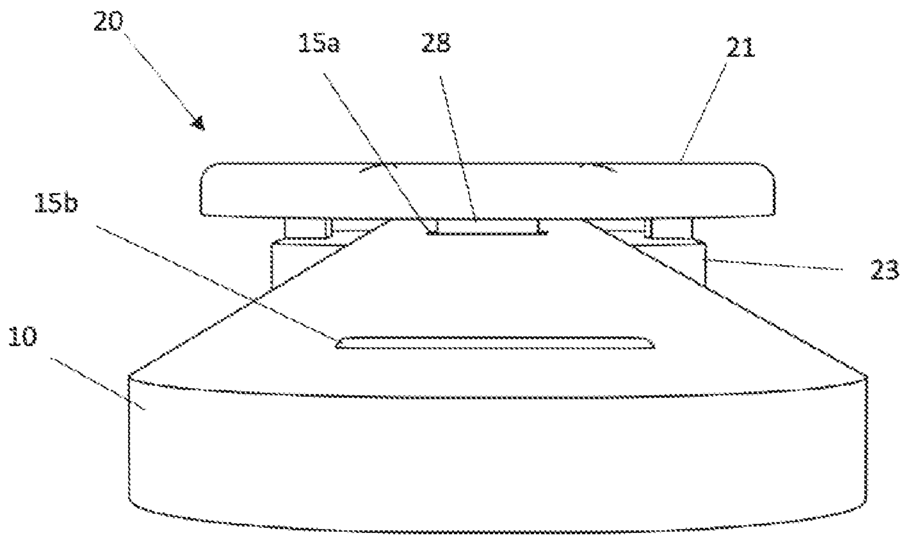

The engagement element or hub 20, which is shown in more detail in FIGS. 3 and 4, comprises a user engaging portion or thumb plate 21 that is located above the upper surface 13 of the arm 10. The thumb plate 21 is circular or oval shaped in plan-view, and includes an outwardly facing upper surface 22 with a dished shape that is configured to be engaged by a thumb or other digit of a user in order to enable the user to apply a force to the page holder device 1 in order to press the device towards the pages 51 of the book 50.

The hub 20 further comprises a book engaging portion 23 on the opposite side of the arm 10 to the thumb plate 21. The book engaging portion 23 includes a tapered or V-shaped protrusion 24 that is configured to be received within a spine or gutter area 52 of the book 50 between the pages 51 thereof in order to assist with maintaining the page holder device 1 in the correct position with respect to the book 50. The book engaging portion 23 is connected to the thumb plate 21 by a connecting portion 26 that extends between the book engaging portion 23 and the thumb plate 21 on one side of the arm 10.

The hub 20 includes a rectangular shaped opening or aperture 25 that extends through the hub 20 from one side to the other thereof. The aperture 25 is defined between the thumb plate 21 and the book engaging portion 23 of the hub 20, and has a height that is greater than the thickness of the arm 10. The aperture 25 is closed along one of its side edges by the connecting portion 26 of the hub 20, and is partially closed along its other side edge by a retaining protrusion 27 that extends downwardly from the thumb plate 21 towards the book engaging portion 23 on the opposite side of the hub 20 to the connecting portion 26 but is not connected to the book engaging portion 23. The arm 10 is received within the aperture 25 and is movable through the aperture 25 in a direction aligned with its longitudinal axis in order to enable the hub 20 to slide along the length of the arm 10.

A protrusion or pin 28 extends downwardly from the thumb plate 21 into the aperture 25. The pin 28 is shaped and dimensioned to be received within the retaining apertures 15*a*, 15*b*, 15*c* provided in the arm 10 in order to releasably fix the hub 20 at a defined position along the arm 10. In particular the pin 28 is configured to be received within the central aperture 15*a* in order to releasably fix the hub 20 at an inner position towards the mid-point of the arm 10, as shown in FIGS. 1A and 1B, and to be received within the outer apertures 15*b*, 15*c* in order to releasably fix the hub 20 at a pair of outer positions towards the ends 11, 12 of the arm 10, one of which is shown in FIGS. 2A and 2B.

Use of the page holder device 1 will now be described with reference to FIGS. 1A, 1B, 2A, 2B, 5A, and 5B.

Figure 1A:
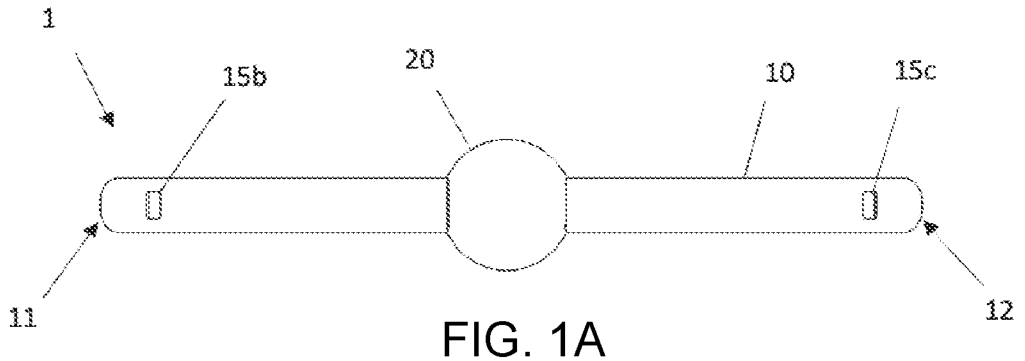
FIGS. 1A, 1B, 2A and 2B schematically illustrate a page holder device in accordance with one possible embodiment of the present invention.
Figure 1B:
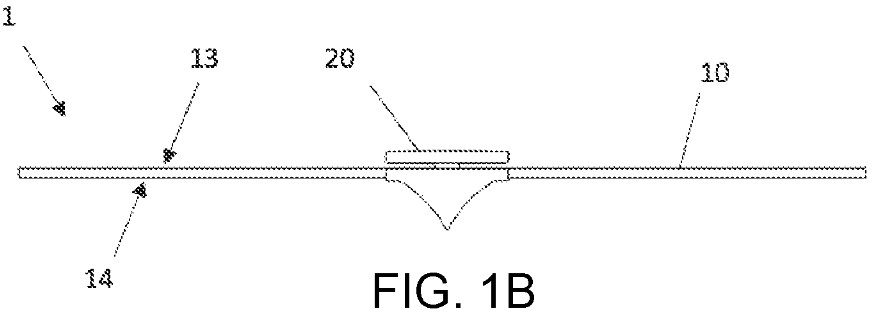

When it is desired to use the page holder device 1 to hold the pages 51 of a book 50 open, the device 1 is used with the hub 20 located at the inner position towards the mid-point of the arm 10, as shown in FIGS. 1A and 1B, with the pin 28 received within the central aperture 15*a* of the arm 10. When the page holder device 1 is in this configuration the arm 10 may be placed across the pages 51 of the book 50 as shown in FIG. 5A, and a user of the device 1 may apply downward pressure to the thumb plate 21 of the hub 20 using a thumb or finger in order to press the arm 10 towards the book 50 and keep the book 50 open using a single hand. Due to the comparatively long length of the arm 10, the arm 10 is capable of extending across the majority of the width of the pages 51 of a typical book 50, as shown in FIG. 5A, thereby preventing the pages 51 from lifting even when the device 1 is used to assist a user with reading in a windy environment.

Figure 2A:
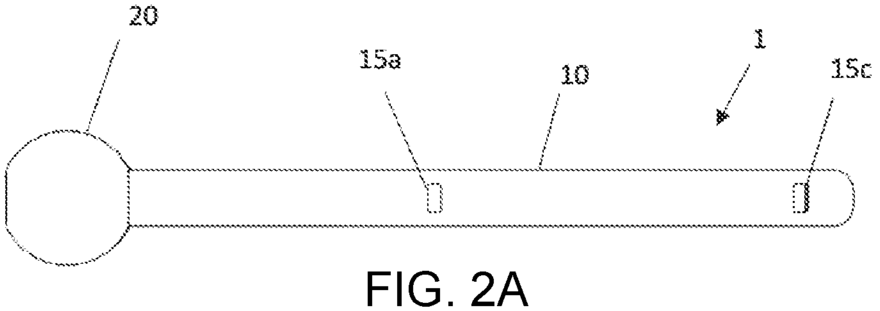
Figure 2B:
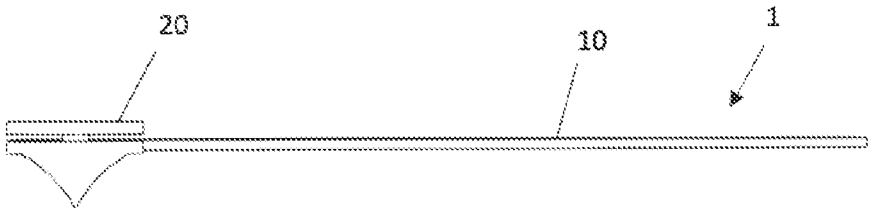

When it is desired to use the page holder device 1 as a bookmark at the end of a reading session, the hub 20 is moved from the inner position shown in FIGS. 1A and 1B to one of the outer positions towards one of the ends 11, 12 of the arm 10, as shown in FIGS. 2A and 2B. To do this, the pin 28 is first disengaged from the central aperture 15*a* of the arm 10 by lifting the thumb plate portion 21 of the hub 20 upwardly with respect to the arm 10. As the hub 20 is lifted, the connecting portion 26 that connects the thumb plate 21 to the book engaging portion 23 is able to deform slightly to allow the thumb plate 21 to pivot away from the book engaging portion 23, thereby facilitating disengagement of the pin 28 from the central aperture 15*a*. The hub 20 may then be slid along the arm 10 towards an end 11, 12 of the arm 10 until the pin 28 is received within one of the outer apertures 15*b*, 15*c*, thereby locking the hub 20 in one of its outer positions.

Figure 5B:
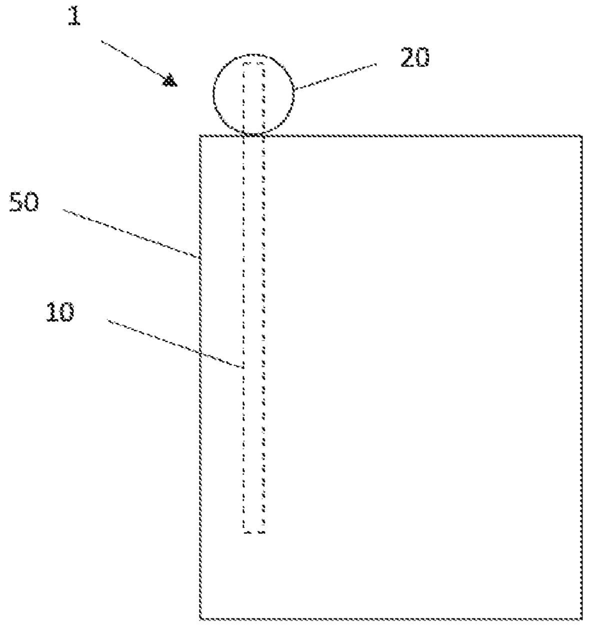

When the page holder device 1 is in this configuration, it can be used as a bookmark as shown in FIG. 5B, with the hub 20 being located outside the book 50 but with the majority of the length of the arm 10 being received inside the book 50 and extending along a significant portion of the height of the book 50 at a position close to the book's spine, thereby securely retaining the page holder device 1 within the book 50.

The hub 20 may subsequently be returned to its inner position as shown in FIGS. 1A and 1B by lifting the thumb plate portion 21 of the hub 20 to disengage the pin 28 from the outer aperture 15*b* or 15*c* and then sliding the hub 20 back towards the centre of the arm 10 until the pin 28 is received within the central aperture 15*a*.

It will be appreciated that many modifications may be made to the above-described embodiments without departing from the scope of the present invention as defined in the appended claims. For example, in the above-described embodiment, the upper and lower parts of the hub are only connected to each other by a single connecting portion on one side of the arm. However, in another embodiment the upper and lower parts of the hub may be connected to each other by a pair of connecting portions on opposing sides of the arm. In this case the hub may be formed of a flexible or elastomeric material, and may be configured to enable the pin to be lifted out of the retaining apertures in the arm by the application of a compressive force to the hub, for example by squeezing inwardly on the hub with a thumb and finger.

In addition, other locking mechanisms for temporarily fixing the position of the hub with respect to the arm are possible besides the pin and aperture arrangement described above, including an interference fit between the hub and the arm.

In addition, in the above-described embodiment, the hub comprises a user engaging portion in the form of a thumb pad with an upper surface that is configured to be pressed by a thumb or other digit of a user. However, in other embodiments the user engaging portion of the hub could equally include an aperture that is configured to receive a thumb or other digit of a user in order to enable the page holder device to be worn like a ring.

Other modifications and variations will also be apparent to the skilled person.

The invention claimed is:

1. A page holder device, the page holder device comprising an elongate arm that is configured to extend across pages of an open book, and an engagement element that is coupled to the elongate arm and configured to be engaged by a user of the page holder device in order to press the page holder device towards the open book, wherein the elongate arm comprises a plurality of holes each extending through a thickness of the elongate arm from an upper surface of the elongate arm to a lower page engaging surface of the elongate arm, the engagement element comprises a user engaging portion, a book engaging portion, an aperture within which the elongate arm is received and a pin the user engaging portion is located on a first side of the elongate arm, a book engaging portion is located on a second side of the elongate arm opposed to the first side, and the pin extends downwardly from the user engaging portion into the aperture, the user engaging portion including a pad configured to be engaged by one or more digits of a user in order to apply a force to the elongate arm of the page holder device, and the book engaging portion comprising a protrusion that is configured to be received within a spine or gutter area of a book, the page holder device as holding the pages of the open book, the page holder device is coupled to the engagement element with the pin received within a central hole of the plurality of holes, the user applies downward pressure to the user engaging portion using a thumb of the user to press the elongate arm towards the open book, in the page holder device as a bookmark, the pin is disengaged from the central hole of the plurality of holes based on lifting the user engaging portion upwardly with respect to the elongate arm, the engagement element slides along the elongate arm until the pin is received within one of an outer hole of the plurality of holes thereby locking the engagement element in outer position.

2. The page holder device according to claim 1, wherein the engagement element is configured for sliding movement along the arm.

3. The page holder device according to claim 1, wherein the elongate arm being movable within the aperture in a direction aligned with longitudinal axis.

4. The page holder device according to claim 1, wherein the engagement element is formed of a flexible or elastomeric material, and is configured to be deformed in order to facilitate disengagement of the locking mechanism.

5. The page holder device according to claim 1, wherein the user engaging portion of the engagement element is movable relative to the book engaging portion of the engagement element in order to facilitate disengagement of the locking mechanism.

6. The page holder device according to claim 1, wherein the arm has a length of at least 120 mm, or at least 150 mm.

7. The page holder device according to claim 1, wherein the arm has a width of at least 8 mm, or at least 10 mm.

8. The page holder device according to claim 1, wherein the arm has a thickness lower than its width, with a thickness of 3 mm or less.

9. The page holder device according to claim 1, wherein the arm is formed of a material that is at least substantially transparent.

* * * * *